United States Patent
de Geus et al.

(10) Patent No.: US 11,242,692 B2
(45) Date of Patent: Feb. 8, 2022

(54) SECURITY SYSTEMS, APPARATUSES, METHODS, AND INTEGRATED TECHNOLOGIES INVOLVING THE SAME

(71) Applicant: Be Ready LLC

(72) Inventors: Michael de Geus, Warrenton, VA (US); Mitchell Chait, Las Vegas, NV (US)

(73) Assignee: Be Ready LLC, Costa Mesa, CA (US)

( * ) Notice: Subject to any disclaimer, the term of this patent is extended or adjusted under 35 U.S.C. 154(b) by 0 days.

(21) Appl. No.: 16/988,646

(22) Filed: Aug. 8, 2020

(65) Prior Publication Data

US 2021/0040761 A1     Feb. 11, 2021

Related U.S. Application Data

(60) Provisional application No. 62/884,997, filed on Aug. 9, 2019.

(51) Int. Cl.
*E04H 9/00* (2006.01)
*G08B 25/00* (2006.01)

(52) U.S. Cl.
CPC ............. *E04H 9/00* (2013.01); *G08B 25/006* (2013.01); *G08B 25/007* (2013.01)

(58) Field of Classification Search
CPC ....................................................... E04H 9/00
See application file for complete search history.

(56) References Cited

U.S. PATENT DOCUMENTS

| | | | |
|---|---|---|---|
| 2005/0253708 A1* | 11/2005 | Bohman | E05B 39/04 340/539.22 |
| 2015/0215755 A1* | 7/2015 | Bekanich | H04W 4/90 455/404.1 |
| 2018/0042367 A1* | 2/2018 | de Geus | A45F 4/02 |
| 2018/0176362 A1* | 6/2018 | Cohen | H04W 4/029 |

FOREIGN PATENT DOCUMENTS

WO      2008033098 A1     3/2008

\* cited by examiner

*Primary Examiner* — Travis R Hunnings
(74) *Attorney, Agent, or Firm* — Bryan Cave Leighton Paisner LLP

(57) ABSTRACT

This disclosure relates to systems, methods, and apparatuses for providing security at sites to protect against active shooter situations and other dangerous threats. In certain embodiments, a security system comprises one or more security boxes that are in communication with an electronic security platform. The security boxes house equipment that can be utilized by individuals to protect themselves against security threats and to secure their immediate location. The security boxes also include various electronic components that enable detecting security threats and communicating with the electronic security platform.

18 Claims, 10 Drawing Sheets

SECURITY SYSTEMS, APPARATUSES, METHODS, AND INTEGRATED TECHNOLOGIES INVOLVING THE SAME

CROSS-REFERENCE TO RELATED APPLICATIONS

This application claims priority to U.S. Provisional Patent Application No. 62/884,997 filed on Aug. 9, 2019. The aforementioned application is herein incorporated by reference in its entirety.

TECHNICAL FIELD

The present disclosure is directed to a security system that includes security boxes, wearable devices, and centralized electronic security platforms that are integrated to provide protection and reactionary protocols against security threats and other hazardous situations.

BACKGROUND

In recent years, the number of active shooter situations has dramatically increased throughout the United States and other parts of the world. Many of these active shooter situations are the result of foreign and/or local terrorist activities. With the goal of inflicting as many casualties as possible, active shooters often select a "soft target" (e.g., sites such as a school, a stadium or airport)) which is populated with unarmed and/or unprotected civilians. Civilians caught in these situations often have no way to protect themselves.

Although various security systems are currently available; these systems suffer from a number of drawbacks. One major drawback of these security systems is that they are not well suited for addressing active shooter situations and other types of imminent threats. Although certain security systems may be capable of sending a notification to a third party security service or law enforcement entity that identifies a real or potential threat, there is often a significant delay before law enforcement or security personnel are able to arrive at the site of the ongoing threat. This results in civilians or individuals at the site being forced to fend for themselves until law enforcement or security personnel are able to arrive at the site.

Another drawback of traditional security systems is that they do not facilitate ongoing support to those individuals who are facing a threat. For example, in the case of an active shooter threat, these systems are unable to continuously provide updates on the status of the threat to the individuals facing the threat, nor are they able to receive or utilize feedback from the individuals facing the threat (despite the fact that the individuals facing the threat are typically the individuals who have the most up-to-date information on the status and/or location of the threat). Instead, traditional security systems merely relay the notification to appropriate personnel (e.g., law enforcement or security entities).

In view of the foregoing; there is a need for a security system that can be used for protection in active shooter and other dangerous situations. There also is a need for a security system that assist with protecting civilians and other individuals during these dangerous situations until law enforcement or security personnel are able to arrive at the site. There is further a need for a security system is able to provide updates to, and receive updates from, individuals facing the threat in real-time as the threat is ongoing.

BRIEF DESCRIPTION OF DRAWINGS

The principles are illustrated in the figures of the accompanying drawings, which are meant to be exemplary and not limiting, and in which.

DETAILED DESCRIPTION OF EXEMPLARY EMBODIMENTS

Figure 1:
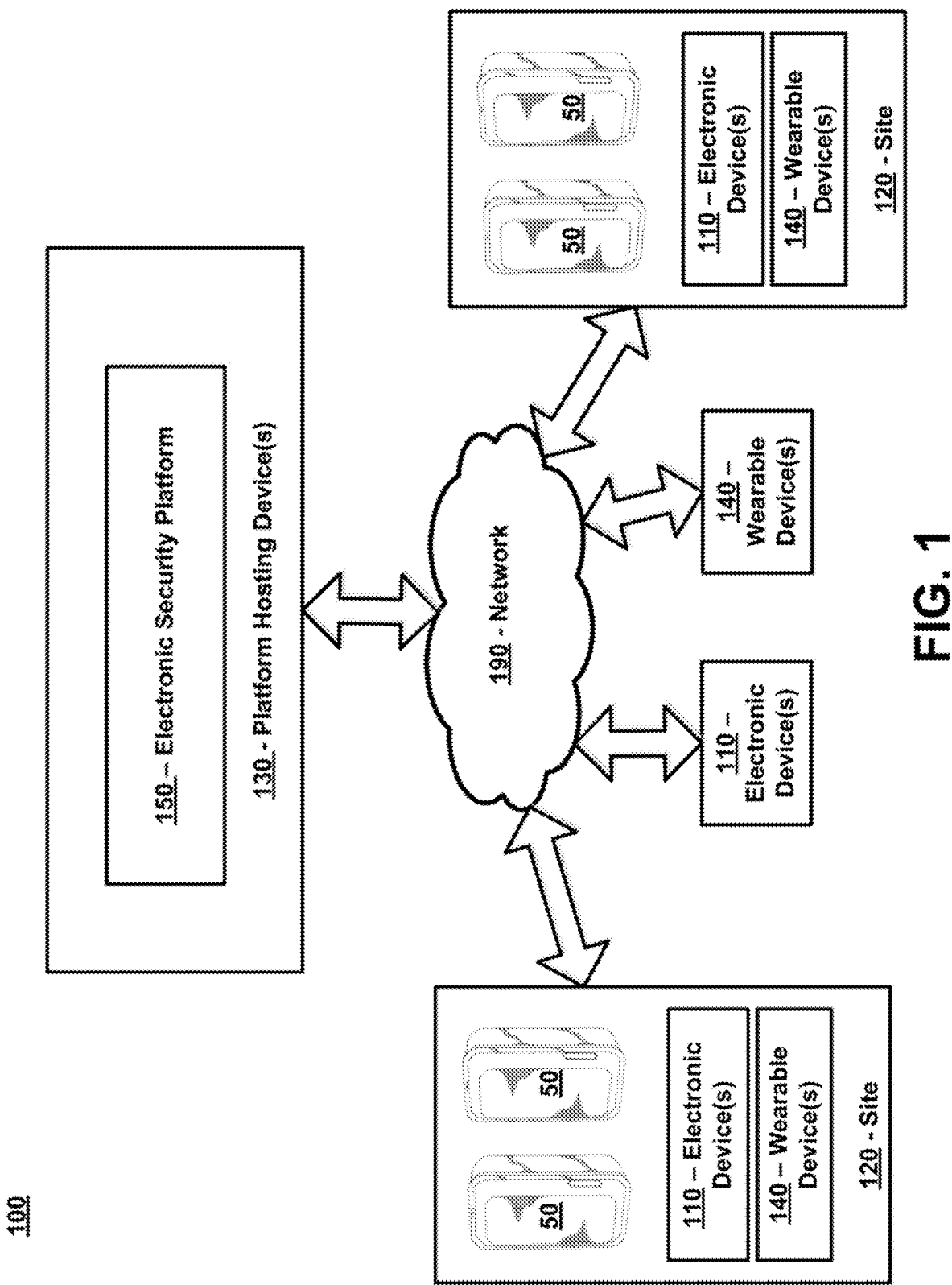
FIG. 1 is a diagram of an exemplary security system in accordance with certain embodiments.

The present disclosure relates to security systems, apparatuses, and methods that provide communication, protection, and security measures to defend against physical threats, such as active shooter situations, robberies, burglaries, home invasions, and other threats that risk inflicting bodily injury, particularly for soft targets such as schools, churches, homes, hospitals, concert venues, businesses, and other targets and/or environments.

An exemplary system can include one or more security boxes, each of which stores various tools, equipment, and/or devices that can be used to provide protection against such security threats. Each box may be equipped with various electronic components (e.g., such as sensors, communication devices, input/output devices) that can provide assistance with identifying the presence of a threat, notifying appropriate entities of the threat, and maintaining communication with those entities while the threat is ongoing. Furthermore, each security box may include a housing comprising various compartments that are equipped with door securing devices, protective vests or coverings, vision obstruction accessories, and/or other useful equipment. The equipment included in the security boxes can assist individuals with securing their locations while the potential threat is ongoing.

In certain embodiments, the system can also include, or be a part of, an electronic security platform that is in communication with the security boxes and certain other tools provided in conjunction therewith as well as emergency response infrastructure (e.g., alarm system services, police departments, etc.), and which receives alerts from the security boxes and related tools in connection with potential threats. The system can further include wearable devices (e.g., bracelets, smart watches, and other GPS-enabled wearable devices) that communicate with the electronic security platform and which transmit alerts to the electronic security platform relating to real or potential threats. As discussed in further detail below, the components of the system permit individuals to rapidly secure themselves in the event of potential and/or real threats, and also to provide real-time information to the electronic security platform to enable various safety measures to be executed in the event of real and/or potential threats.

The system described herein can be utilized in various environments. In certain embodiments, the system can be installed in and/or throughout schools to protect against active shooter situations and other types of threats. The system can also be installed in and/or throughout residences, offices, business, churches, and/or any other locations to provide protection against such security threats.

It should be noted that any feature described for an embodiment illustrated in the figures or otherwise disclosed herein can be incorporated into, or combined with, any other embodiment described herein. Moreover, one of ordinary skill in the art would recognize that the shapes, configurations, and/or structures of the security boxes can vary, and that the components of the security boxes can be configured in other arrangements. It should also be recognized that none of the features described herein are to be considered essential and can be omitted in various embodiments.

FIG. 1 is a diagram of an exemplary security system 100 in accordance with certain embodiments. The system 100 comprises one or more security boxes 50 located at one or more sites 120, one or more electronic computing devices 110, one or more platform hosting devices 130, and one or more wearable devices 140 that are in communication over a network 190. An electronic security platform 150 is stored on, and executed by, the one or more platform hosting devices 130. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1, including the security boxes 50, electronic computing devices 110, platform hosting devices 130, wearable devices 140, and electronic security platform 150, can be configured to communicate directly with each other and/or over the network 190 via wired or wireless communication links, or a combination of the two. Each of the security boxes 50, electronic computing devices 110, platform hosting devices 130, wearable devices 140 also can be equipped with one or more transceiver devices, one or more computer storage devices (e.g., RAM, ROM, PROM, SRAM, etc.), and one or more processing devices (e.g., CPUs, GPUs, etc.) that are capable of executing computer program instructions. The computer storage devices can be physical, non-transitory mediums.

The system 100 described herein can be utilized to implement security at various sites 120. In certain embodiments, the system 100 and security boxes 50 can be installed at sites 120 comprising schools (e.g., to protect against active shooter situations and other types of threats). The system 100 can also be installed at sites 120 comprising residences, offices, business, churches, and/or any other locations to provide protection against such security threats.

The system 100 can be utilized to provide protection against various types of threats. One type of threat may include a real or potential active shooter situation. Other types of threats may include real or potential robberies, burglaries, home invasions, and/or other threats that risk inflicting bodily injury or personal loss. Other types of threats may include natural disasters (e.g., hurricanes, earthquakes, tornados, etc.). Other types of threats may include hazardous situations involving biological or chemical agents (e.g., elevated carbon monoxide levels or biological attacks).

In certain embodiments, the electronic security platform 150 can serve as a centralized system endpoint that is in communication with a plurality of the security boxes 50 located at various sites 120 and/or other system components. As explained herein, the electronic security platform 150 provides various functions associated with monitoring the sites 120 and communicating with the security boxes 50 located at the sites 120 to implement various safety measures. For example, the electronic security platform 150 can receive alerts from the security boxes 50 and other system components (e.g., such as wearable devices 140 as described herein). In response to receiving an alert, the electronic security platform 150 can be configured to coordinate with onsite personnel (e.g., security and/or administrators located at the site 120) and offsite personnel (e.g., law enforcement entities) about the presence of the threat. The electronic security platform 150 also can initiate communications with the security boxes 50 to implement various safety measures. For example, the electronic security platform 150 can communicate with the security boxes 50 (including those security boxes 50 that did not originate the alert) to notify individuals of the threat and to provide them updates on the status of the threat. Individuals located at the site 120 where the threat is occurring may also utilize the security boxes 50 to provide updates to the electronic security platform 150 of the status of the ongoing threat.

In one example, a plurality of security boxes 50 can be located within a school (e.g., in classrooms or other areas) and an electronic security platform can be in communication with each of the security boxes 50. In addition to providing protective gear and other safety equipment, the security boxes 50 can be used to transmit alerts to the electronic security platform 150 that indicate the presence and location of security threats, hazardous conditions, or other adverse conditions. One or more individuals (e.g., administrators, teachers, security guards, law enforcement officers, or others provided electronic access) who are tasked with monitoring the school or other location can utilize the electronic security platform 150 and its ability to communicate with the security boxes 50 to monitor the school or location, communicate with appropriate personnel (including security/police officers and emergency response units, fire personnel, emergency medical service personnel, and/or other teachers/administrators) and to implement various safety measures, if necessary.

In other related embodiments, the security boxes 50 can be located at various other locations, such as residences and/or offices. Once again, the security boxes 50 can be used to transmit alerts to the electronic security platform 150 that indicate the presence and location of security threats, hazardous conditions, or other adverse conditions. An individual associated with the platform 150 (e.g., a platform administrator, office manager, security officer and/or home owner) can utilize the electronic security platform 150 and its communication with the security boxes 50 to monitor the locations where the security boxes 50 are located, to communicate with appropriate personnel, and to implement various safety measures, if necessary.

In certain embodiments, the electronic security platform 150 is stored on one or more platform hosting devices 130. In certain embodiments, the one or more platform hosting devices 130 can include one or more servers. The one or more servers can include one or more mainframe computing devices that execute web servers capable of communicating with the security boxes 50 and/or other devices over the network 190. The one or more platform hosting devices 130 can additionally, or alternatively, include desktop computers, laptop computers, mobile devices (e.g., smart phones, personal digital assistants, tablet devices, vehicular computing devices, smart watches, and/or any other devices that are mobile in nature), smart speakers (e.g., such as Google Home or Amazon Echo), and/or other types of computing devices. The one or more platform hosting devices 130 can include one or more storage devices and one or more processors (including any of the storage devices or processors mentioned within this disclosure). In certain embodiments, the electronic security platform 150 can additionally, or alternatively, be provided via a cloud-based or web-based environment that is accessible over the network 190. The electronic security platform 150 can additionally, or alternatively, be provided in connection with a software-as-a-service (SaaS) solution.

The electronic computing devices 110 (e.g., desktop computers, smart phones, laptops, tablets, etc.) can be utilized by various individuals to access the electronic security platform 150. Administrators, security personnel, law enforcement officers, and/or other individuals may be provided access to a backend of the electronic security platform 150 that provides various functions or monitoring one or more sites 120. As explained in further detail, the backend portion of the electronic computing devices 110 can access the electronic security platform 150 to monitor the statuses of the sites 120 where the security boxes 50 are installed, view details of detected threats, and execute appropriate actions for implementing safety measures.

The electronic computing devices 110 also can be utilized by various end-users located at the sites 120 (e.g., students, teachers, office employees, etc.) to access the electronic security platform 150. As explained in further detail below, these individuals can access various interfaces (e.g., such as those illustrated in FIGS. 3A-3I) that enable them to report a threat, monitor an ongoing threat, provide updated information pertaining to an ongoing threat, and/or receive information pertaining to an ongoing threat.

Various end-users located at the sites 120 (e.g., students, teachers, office employees, etc.) may also be equipped with wearable devices 140 (e.g., smart bracelets/bands, smart watches, etc.). As explained in further detail below, the wearable devices 140 can include various sensors that assist with detecting security threats and monitoring locations of these individuals during ongoing threats.

Figure 2A:
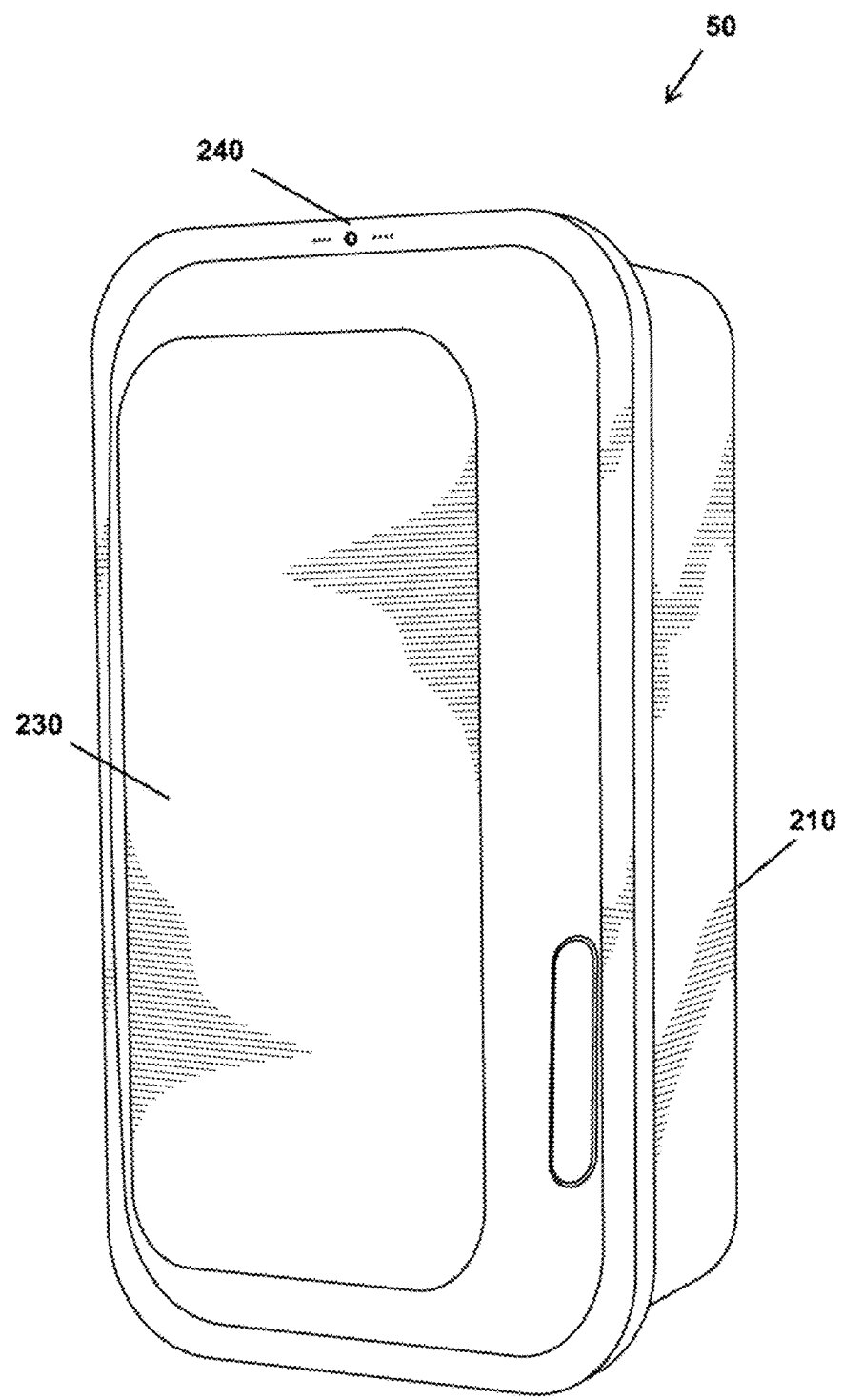
FIG. 2A is a front perspective view of an exemplary security box according to certain embodiments.
Figure 2B:
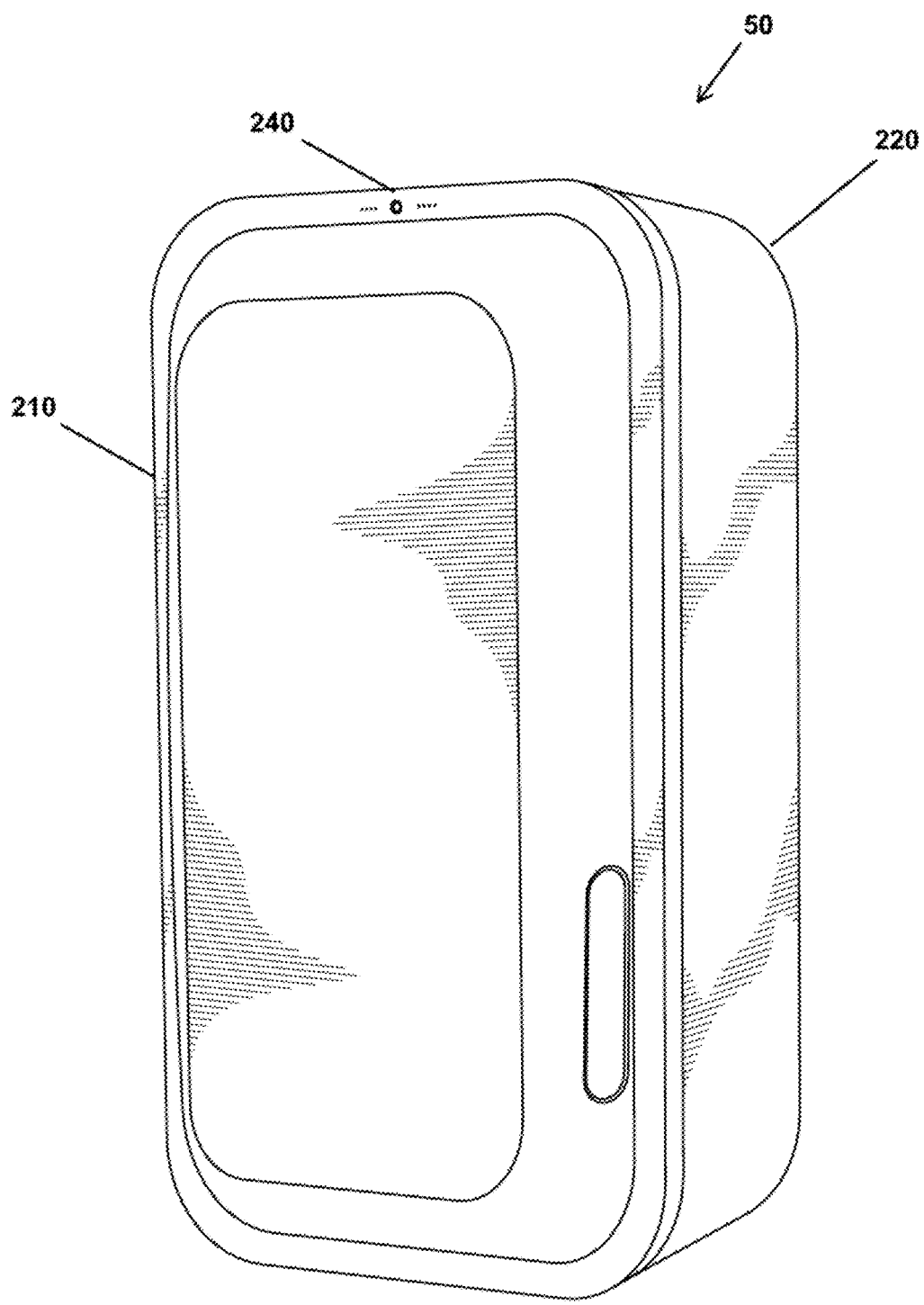
FIG. 2B is a front perspective view of an exemplary security box outfitted with an mounting mechanisms according to certain embodiments.
Figure 2C:
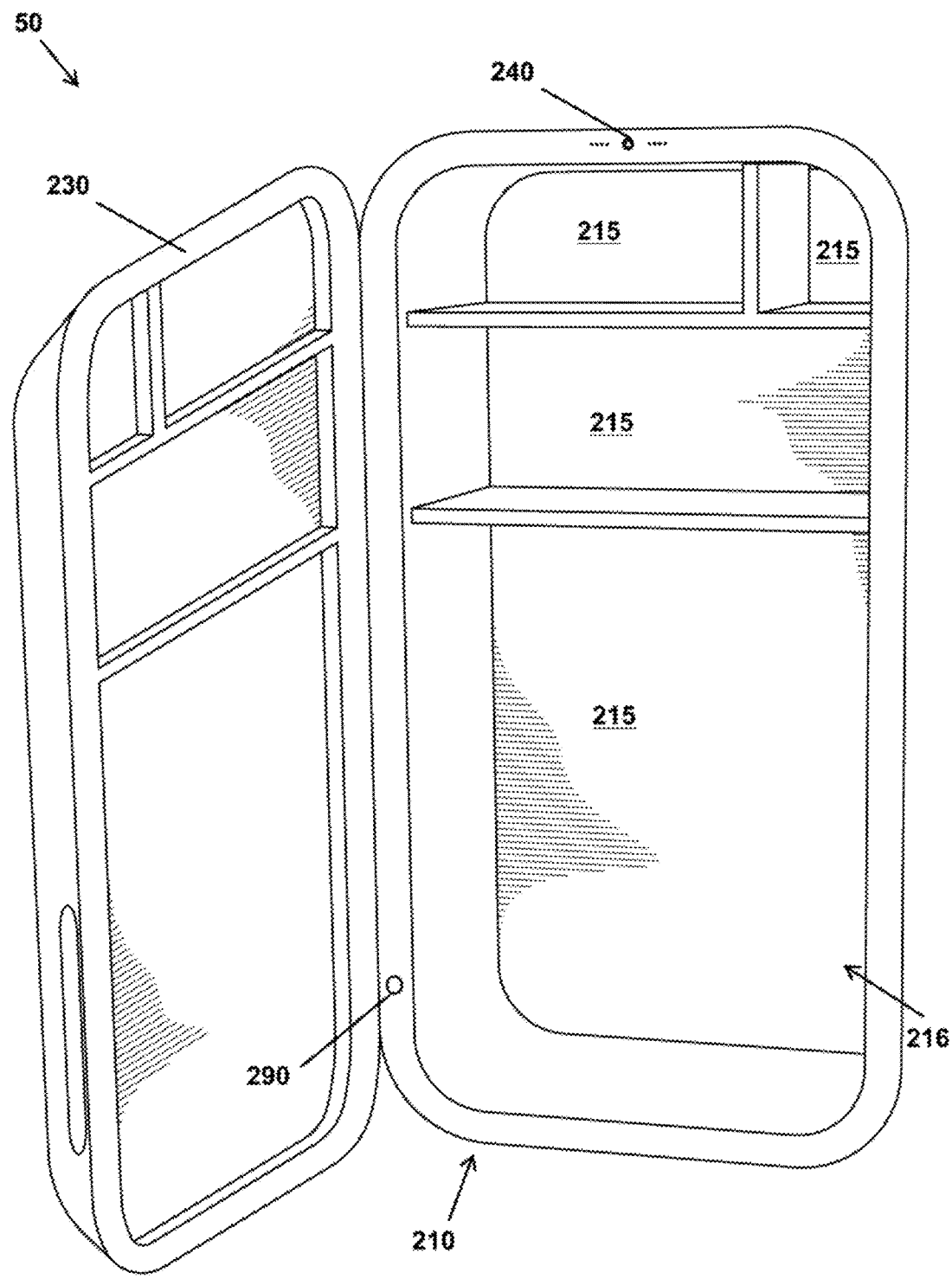
FIG. 2C is a front perspective view of an exemplary security box in an open position according to certain embodiments.
Figure 2D:
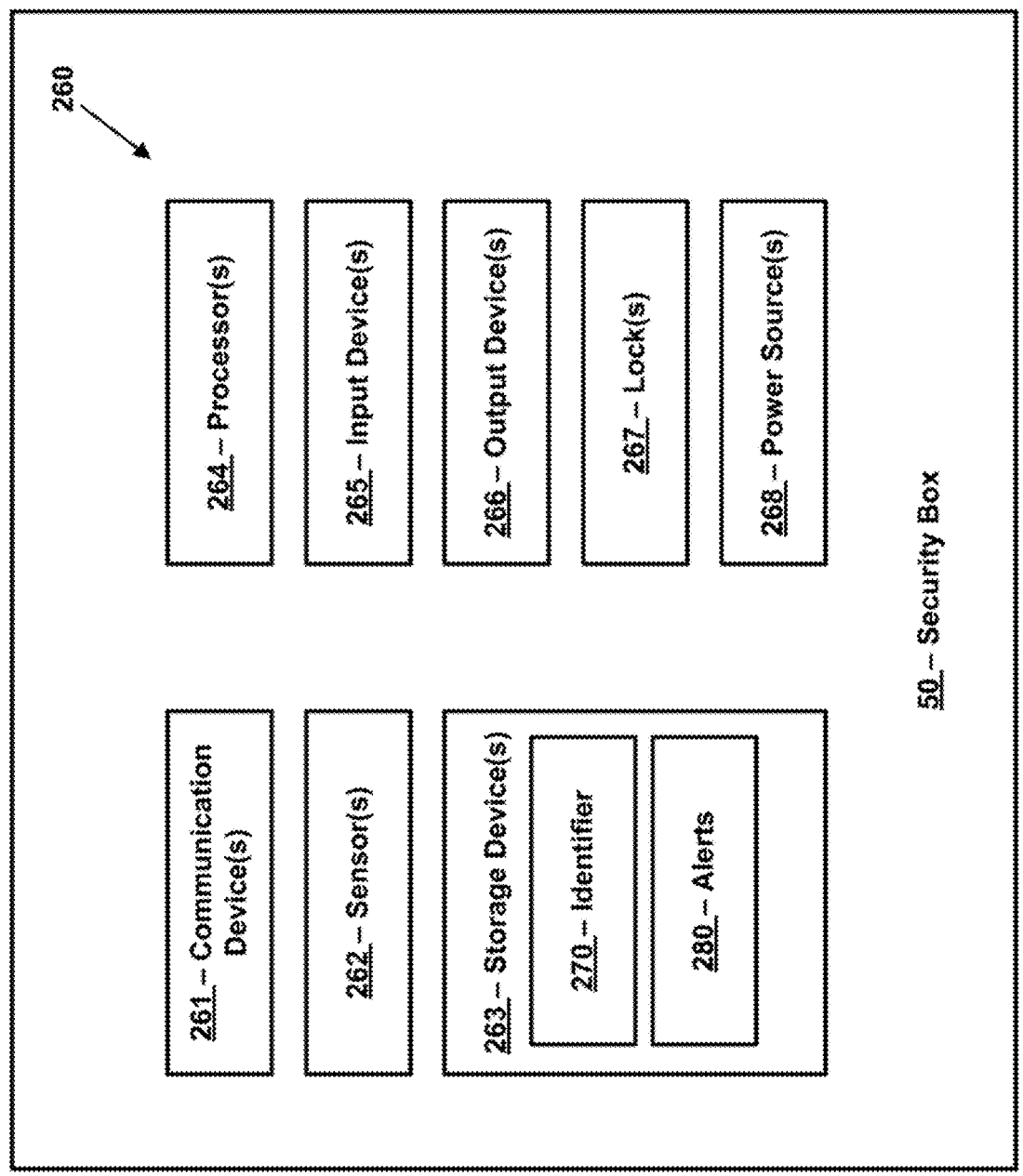
FIG. 2D is a block diagram that illustrates exemplary components and features that can be incorporated or integrated into a security box according to certain embodiments.
Figure 2E:
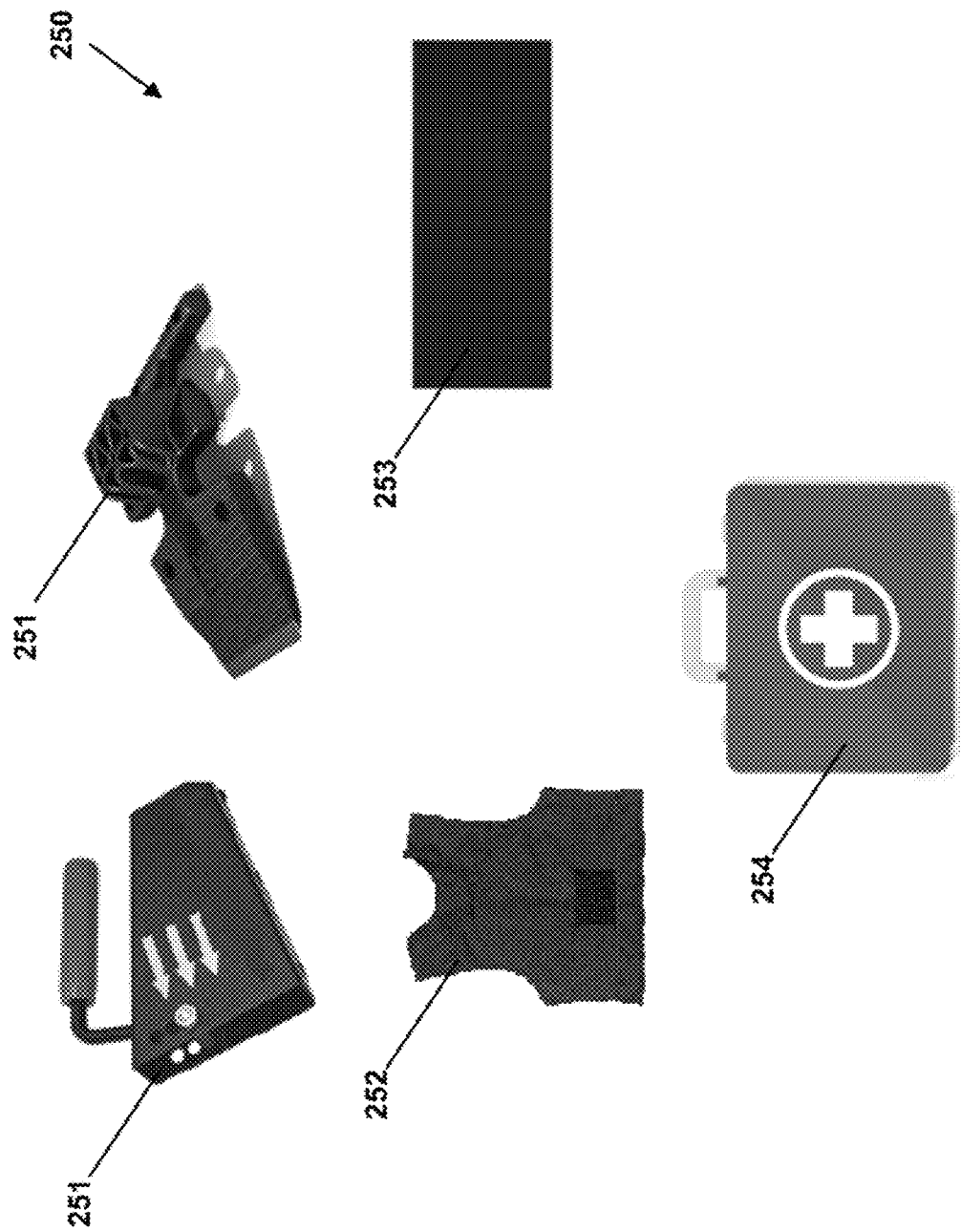
FIG. 2E illustrates exemplary equipment that may be included inside of a security box according to certain embodiments.

As mentioned above, the electronic security platform 150 can be configured to communicate with security boxes 50 located at various sites 120. FIGS. 2A-2E illustrate exemplary configurations and features of the security boxes 50 according to certain embodiments. In particular, FIGS. 2A-2C illustrate an exemplary security box 50 according to certain embodiments. FIG. 2D illustrates exemplary electronic components 260 and features that can be incorporated into the security boxes. FIG. 2E illustrates exemplary equipment 250 (e.g., tools, devices, instruments, etc.) that may be included within one or more compartments 215 of the security boxes 50.

All of the components and equipment (including those illustrated in FIGS. 2D and 2E) are optional features that may be integrated directly into the housing 115 of the security boxes 50 and/or included inside of the security boxes 50. Additional components, equipment, tools, or devices may also be integrated into, or included inside of, the security boxes 50. These components 260, equipment 250, and features can be integrated into the security boxes 50 in any combination, and some or all of the components 260, equipment 250, and features can be omitted in certain embodiments.

The configurations and contents of the security boxes 50 can be varied to accommodate different environments. For example, this may include varying or customizing one or more of the following: the size of the security boxes 50; the type, sizes, and number of compartments included in the housing of the security boxes 50; the type of contents included in the security boxes 50 (e.g., the type of equipment 250, components 260, devices, and/or accessories included in the boxes); the amount of contents included in the security boxes 50 (e.g., the number of door securing devices 251, protective vests/coverings 252, vision obstruction accessories 253, medical kits 254, and/or other equipment 250 included within the security boxes 60); and/or the types of electronic and computing components integrated into the security boxes 50 (e.g., the type of communication devices 261, sensors 262, storage devices 263, processors 264, input devices 265, output devices 266, locks 267, power sources 268, and other components that are incorporated into the security boxes 50).

The housing structure 210 of the security boxes 50 can vary. In certain embodiments, each of the security boxes 50 includes a housing 210 comprising one or more doors 230 that provide access to an inner cavity 216 within the security boxes 50. In certain embodiments, each of the security boxes 50 includes a housing 210 or inner cavity 216 that comprises at least three compartments 215 (see FIG. 2C): a first compartment that is equipped with one or more door securing devices 251; a second compartment that is equipped with one or more protective vests/coverings 252; and a third compartment that is equipped with one or more vision obstruction accessories 253. As explained in further detail below, arranging security boxes 50 with these compartments 215 allows individuals to quickly execute a three-step protocol for securing a location (e.g., a classroom), which enables individuals located within the room to be equipped with appropriate protective gear and to be hidden from view. Other compartments 215 may be incorporated into the security boxes 50 as well (e.g., including, but not limited to, compartments that comprise one or more speakers, microphones, video cameras, video displays, components that allow for one-way or two-way communication, and/or other emergency management devices).

The types of door securing devices 251 (see FIG. 2E) included in the security boxes can vary. Generally speaking, the door securing devices can include any device or structure that is utilized to secure a door in a closed position. In certain embodiments, the door securing devices 251 can include door wedges, door barricades, door jamming devices, and/or door braces. The door securing devices 251 can also include straps, sleeves and other devices that are used to secure a door arm (e.g., an arm included in a hydraulic door assembly). Exemplary sleeves can include shortened sections (e.g., segments) of a firehose that can be fitted over door arms to prevent opening of the doors. Other types of door securing devices 251 can also be utilized.

The types of protective vests and/or coverings 252 included in the security boxes can also vary. Generally speaking, the protective vests 252 can include any type of vest or covering that provides protection for an individual's torso or body. The protective vests 252 can include armor portions for protecting an individual against projectiles (e.g., certain bullets), knives, or other threats. For example, the protective vests 252 can be configured to protect an individual's chest, back, and/or side regions. The armor portions of the protective vests 252 may be composed of, or include, any plated or non-plated armor material. Exemplary materials that may be incorporated into the armor components may include any of the following materials either alone or in combination: metals (e.g., steel, iron, and titanium), plastics (e.g., polyethylene), high-strength fibers (e.g., Kevlar®, aramid or para-aramid fibers, and hydrocarbon fibers) and/or any other materials that can provide protection against projectiles (e.g., bullets) or the like. The armor components may be permanently integrated into the vests 252 and/or may be removable to allow for replacement or upgrading.

In certain embodiments, the security boxes 50 can include a plurality of protective vests 252 (e.g., such as to secure multiple individuals located in a classroom, a residence, or an office). In such embodiments, the configuration of the protective vests 252 can be sized in a manner that maximizes the number of protective vests 252 that are able to be stored in the storage boxes, while still being able to provide adequate protection for individuals who utilize the protective vests 252. For example, in certain embodiments, the protective vests 252 can include a space-reducing configuration in which a pair of thin protective panels (e.g., a front protective panel and rear protective panel) is connected by a pair of shoulder straps and a pair of mid-section connectors that are configured to attach the panels to each other around an individual's mid-section. The protective vests 252 can also include one or more adjustment mechanisms for securely fitting the vests around individuals of different sizes and weights. In certain embodiments, each of the protective vests 252 may be included in a slip cover sleeve to minimize an amount of space occupied by the protective vests.

The types of vision obstruction accessories 253 included in the security boxes 50 also can vary. Generally speaking, the vision obstruction accessories 253 can include any structure or device that can be used to block or obstruct an individual's vision of an area or location. Exemplary vision obstruction accessories 253 can include plastic rolls, covers, canvases, sheets, and/or other related accessories. In some cases, the vision obstruction accessories 253 can be utilized to block or obstruct vision through a window or opening. In certain embodiments, the security boxes 50 can also include connectors for attaching the vision obstruction accessories 253 to walls or other structures. Exemplary connectors can include adhesive connectors (e.g., tapes, glues, and/or self-adhesives) and/or mechanical connectors (e.g., nails, pins, screws, bolts, nuts, and/or the like). The connectors can be integral with the vision obstruction accessories 253 or can be separate components that can be connected to the vision obstruction accessories 253.

In certain embodiments, the security boxes 50 can also include other types of equipment, devices, or accessories that can be useful in situations involving real or potential security threats. For example, in certain embodiments, the security boxes 50 can include one or more of the following: weapons (e.g., guns, knives, pepper sprays, maces, and/or other defensive or reactionary type weapons), ammunition, flashlights, first aid kits, medical kits 254, medical supplies, tourniquets, and/or other emergency related items. These additional items can be included in one or more of the compartments 215 mentioned above, and/or in other compartments included within the housing of the security boxes 50.

The security boxes 50 can further include one or more mounting mechanisms 220 for attaching the security boxes to walls and/or other structures. Generally speaking, the mounting mechanisms 220 can include any known or later developed connector. Exemplary mounting mechanisms 220 can include connectors such as braces, brackets, screws, bolts, nails, nuts, adhesives, hook and loop connectors (e.g., Velcro® connectors), and/or any combination thereof. Other types of mounting mechanisms 220 can also be utilized to secure the security boxes to walls or other structures.

FIG. 2C discloses an exemplary mounting mechanism 220 that is connected to a security box 50. The mounting mechanism 220 is situated around the top, left, right, bottom, and rear surfaces of the security box 50, thereby encasing the security box while exposing the front surface of the security box that includes the door 230. The rear surface of the mounting mechanism 220 can be connected or attached to a wall or surface (e.g., using bolts, screws, and/or other hardware). The mounting mechanism 220 can be configured to be removable or detachable from the security box 50.

FIG. 2D illustrates exemplary electronic components 260 and features that can be incorporated into the security boxes 50. Each security box 50 may include electronic components 260 such as one or more communication devices 261, one or more sensors 262, one or more storage devices 263, one or more processors 264, one or more input devices 265, one or more output devices 266, one or more locks 267, and/or one or more power sources 268. All of these components are to be considered optional and may not be included in certain embodiments of the security boxes 50. Other types of electronic components 260 may also be incorporated or integrated into the security boxes 50.

Each of the security boxes 50 can include one or more communication devices 261. The communication devices 261 can include any device for communicating over a wired and/or wireless communication channel or communication link. In certain embodiments, each security box 50 can include one or more of the following communication devices 261: transceivers, transmitters, receivers, communication cards, network connectors, network adapters, and/or integrated circuits. Other types of communication devices 261 can also be used and incorporated into the security boxes 50.

In certain embodiments, the communication devices 261 can be configured to communicate over the network 190. As mentioned above, the network 190 may represent any type of communication network, e.g., such as one that comprises a local area network (e.g., a Wi-Fi network), a personal area network (e.g., a Bluetooth network), a wide area network, an intranet, the Internet, a cellular network, a telecommunications network, a television network, and/or other types of networks. In certain embodiments, the communication devices 261 can enable the security boxes 50 to communicate with the electronic security system or platform 150 described herein (e.g., to transmit distress signals or alerts 280 in various situations, establish one-way or two-way audio/video communication with security personnel or other individuals, relay various information based on sensor inputs/outputs, etc.).

In certain embodiments, the communication devices 261 can enable the security boxes 50 to communicate with each other over directly and/or over the network 190. For example, a real-time audio and/or video connection can be established between a security box 50 located at a first location and one or more additional security boxes 50 located in other locations (thus, permitting two or more security boxes 50 to join a single communication session). A security box 50 situated at the first location can transmit various information (e.g., audio data, video data, sensor data, alerts, and/or other information) to, and receive information from, any other security box 50 included in the system 100. Enabling communication of security boxes 50 with one another can be advantageous to permit individuals situated at a site 120 where an ongoing threat is occurring to communicate directly with one another via the security boxes 50.

In certain embodiments, some or all of the components and devices associated with the security system 100 and/or security boxes 50 may be networked or communicatively connected using Internet of Things (IoT) configurations and protocols (and/or other communication schemes). For example, in certain embodiments, some or all of the security boxes 50, wearable devices 140, electronic devices 110, equipment/components included in the security boxes (e.g., sensors 262, protective vests 252, door securing devices 251, vision obstruction accessories 253, etc.), and/or other components described herein may be outfitted with communication devices that are configured to generate data and to transfer that data over the network 190 (e.g., to the electronic security platform 150). The data generated by these components may permit the electronic security platform 150 to remotely monitor statuses of the equipment 250 and components 260, and to detect the presence or potential presence of emergency situations (e.g., active shooter situations and hazardous environmental situations).

Each of the security boxes 50 also can be equipped with one or more sensors 262. In certain embodiments, the one or more sensors 262 can be configured to detect the opening of one or more doors 230 attached to the security boxes 50. The sensors 262 also can be configured to detect when an individual presses one or more buttons incorporated into the security boxes 50 (e.g., a button or option that sends an alert 280 indicating the presence of an active shooter or emergency situation). The one or more sensors 262 can also be configured to detect hazardous environmental conditions (e.g., such as smoke, carbon monoxide, gas, heat, chemicals, earthquakes, and/or other hazardous conditions). In certain other embodiments, the one or more sensors 262 can be configured to detect the lessening battery life of one or more batteries attached to, or utilized by, the security boxes 50. Exemplary sensors 262 can include one or more of the following: touch sensors, magnetic contact sensors, heat sensors, gas sensors, smoke sensors, pressure sensors, infrared (IR) sensors, proximity sensors, light sensors, temperature sensors, acoustic sensors, sound sensors, video sensors, imaging sensors, seismic sensors, and/or other types of sensors.

In FIG. 2C, the exemplary security box 50 at least include a door sensor 290. The door sensor 290 is configured to detect when the door 230 is in an open position and when the door 230 is in a closed position. In certain embodiments, in response to detecting that the door 230 is in an open position, the security box 50 is configured to send an alert 280 to the electronic security platform 150. The alert 280 may include information that identifies the security box 50 with an identifier 270. The alert 280 may be transmitted by a communication device 161 integrated into, or included within, the security box 50. The alert 280 can also include information that identifies the alert type (in this case, a "door open" alert).

Upon receiving the alert based on the door sensor 290, the electronic security platform 150 may utilize the identifier 270 to automatically identify the location of the security box 50. An administrator (or other individual) associated with the electronic security platform 150 can then take appropriate actions to address the alert 280. For example, the administrator may initiate a two-way audio and/or video communication with the security to inquire why the security box 50 was opened and whether there is a potential threat at the site 120 that includes the security box 50. If a potential threat is ongoing, the administrator can also execute a variety of additional safety measures (e.g., contacting law enforcement or emergency personnel, communicating with other security boxes 50 in the vicinity of the security box 50 that originated the alert 50 to notify them of the threat, using an access control system to limit access to certain areas of the site 120 where the threat is ongoing, etc.). The same or similar safety measures can also be undertaken for any other type of alert 280 generated by the security boxes 50.

Returning to FIG. 2D, each of the security boxes 50 can further include one or more storage devices 263 and one or more processors 264. The one or more storage devices 263 may communicate with the one or more processors 264, and the one or more processors 264 can execute any instructions stored on the one or more storage devices 263. The one or more storage devices 263 may include: i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In certain embodiments, the one or more storage devices 263 can comprise (i) non-transitory memory and/or (ii) transitory memory. The one or more processors 264 can include one or more central processing units (CPUs), graphics processor units, controllers, microprocessors, digital signal processors, and/or computational circuits.

The one or more storage devices 263 can store instructions for implementing any of the functions described herein associated with the security boxes 50, and the one or more processors 264 can be configured to execute any of the functions described herein associated with the security boxes 50. Some of these functions can include one or more of the following: detecting and interpreting signals from the one or more sensors 262; detecting alert conditions (e.g., associated with security threats and hazardous conditions); transmitting and receiving signals (e.g., over the network); communicating with the electronic security platform 150; communicating with third parties (e.g., law enforcement entities); controlling access to the security boxes 50; and/or other functions mentioned in this disclosure.

The one or more storage devices 263 included on the security box 50 can be configured to store data associated with any of the components 260 incorporated into the security box 50. For example, the one or more storage devices 263 can store all data associated with the audio/video component 240, input devices 265, output devices 266, communication devices 261, sensors 262, locks 267, and/or other components 260. This may include storing audio and/or video communications (e.g., including communications between the electronic security platform 150 and the security box 50), records and events pertaining to sensor readings or outputs, access logs (e.g., indicating access attempts for opening the security box 50), and/or other related information and data.

Each security box can be associated with a unique identifier (ID) 270. The unique ID 270 associated with each security box 50 can be stored on the one or more storage devices 263, and can uniquely identify each of the security boxes 50. The unique ID 270 can be included in any alerts 280, notifications, and other types of communications involving the security box 50. For example, in certain embodiments, the security boxes 50 can include their unique IDs 270 in communications with the electronic security platform 150 to permit the electronic security platform 150 to identify the security boxes 50 that initiated an alert 280 or communication, and to identify the locations of those security boxes 50.

The security boxes 50 also can be equipped with various input devices 265 and output devices 266. The input devices 265 and output devices 266 can include one or more of the following: touchpads, touchscreens, keyboards, audio devices (e.g., microphones, speakers, audio cards, etc.), video devices (e.g., digital cameras, digital video cameras, camcorders, A/V recorders, video cards, etc.), joysticks, mouse devices, buttons, displays (e.g., LCD screens, plasma screens, cathode ray tube devices, etc.), and/or other devices. The input devices 265 and output devices 266 can be used to transmit information to the electronic security platform 150, and to display or output information received from the electronic security platform 150. The input devices 265 and output devices 266 also can be used to control the functionality of the security boxes 50 (e.g., to control access to the security boxes, to trigger the sending of security alerts, and to initiate phone, audio, and/or video conference calls or communications). The input devices 265 and output devices 266 can be used for other purposes as well.

The exemplary security box 50 illustrated in FIGS. 2A-2C includes an audio/video component 240 that enables one-way or two-way transmission of audio and video data between the security box 50 and the electronic platform 150, which may be accessed by one or more electronic computing devices 110 (e.g., desktop computers, smart phones, tablets, etc.). The audio/video component 240 is integrated directly into the housing 210 of the security box 50. In certain embodiments, the electronic platform 150 may facilitate the exchange of audio and video communications between the security box 50 and the one or more electronic computing devices 110 accessing the electronic platform 150. For example, administrators and/or security personnel may login (e.g., using a username and password) to the electronic security platform 150 using the electronic computing devices 110 to access audio and/or video data (e.g., a real-time audio/video feed) generated by the audio/video components 240 included on any of the security boxes 50 networked into in the system 150. Likewise, the individuals situated near the security boxes 50 can receive audio communications from the individuals operating the electronic devices 150. In some embodiments, the security boxes 50 may also include an output device (e.g., a display screen) which enables the individuals located in the proximity of the security boxes 50 to view the individuals operating the electronic devices 110.

The audio/video component 240 enables security personnel, administrators, or other persons to communicate with the individuals situated near the security boxes 50 in real-time. This can be particularly advantageous in active shooter situations, or other dangerous situations, so that information can be exchanged between the individuals located near a potential threat (e.g., located at sites 120 and/or security boxes 50 in the vicinity of a potential threat) and the individuals coordinating the response to the threat. While the response to the threat is being coordinated, the individuals located in the proximity of the security boxes 50 can utilize the equipment 250 included in the security boxes 50 (e.g., the door securing devices 251 and vision obstruction accessories 253) to secure their location and equip themselves with protective vests 252.

Each of the security boxes 50 also can be equipped with one or more locks 267. The one or more locks 267 can control access to the security boxes 50 and/or specific compartments 115 of the security boxes 50. The locks 267 can include any type of mechanical locks (e.g., locks that use physical keys and/or physical locking mechanisms) and/or electronic locks (e.g. locks that are electronically powered and/or locks that can be opened using smart keys, key cards, wireless signals, or the like). In certain embodiments, the one or more storage devices 267 can store access logs indicating when the locks 267 are engaged/disengaged, and/or when the door 230 of the security box is opened/closed. These access logs may include indicate timestamps associated with each access attempt or event.

Each of the security boxes 50 can also be equipped with, or connected to, one or more power sources 268. The one or more power sources 268 can include any type of alternating current (AC) and/or direct current (DC) power source. The one or more power sources 268 can be utilized to supply power to any of the components 260 incorporated into the security boxes 50. For example, the one or more power sources 268 can be utilized to supply power to communication devices 261, sensors 262, storage devices 263, processors 264, integrated circuits, input devices 265, output devices 266, locks 267, and/or other devices that are integrated into the security boxes 50. In certain embodiments, the security boxes 50 can be equipped with one or more batteries (e.g., rechargeable batteries and/or non-rechargeable batteries) that are utilized to power the components of the security boxes 50 and/or can include wires and plugs that can be connected to outlets for powering the components 260 of the security boxes 50.

The security boxes 50 can be configured to initiate communications with, and receive communications from, the electronic security platform 150, third parties (e.g., law enforcement systems and agents and/or security personnel and systems), and/or other individuals and entities. Some or all of the communications can be facilitated or enabled by the communication devices 261 included on the security boxes 50. The communications can be transmitted over the network 190. The communications can include alerts 280 that are transmitted by the security boxes 50. The communications can also include calls (e.g., phone calls and/or video conferencing calls) that are transmitted to, or received by, the security boxes 50. The security boxes 50 can also facilitate other types of communications as well (e.g., transmission of sensor 262 readings or outputs, and other types of audio/voice communications, etc.).

In certain embodiments, the electronic security platform 150 may be configured to remotely control one or more components 260 and/or functions associated with the security boxes 50. For example, the electronic security platform 150 may communicate with the security boxes 50 over the network 190 to remotely control display screens, audio devices, sensors, locks, and other components associated with the security boxes 50. The electronic security platform 150 can transmit commands for remotely controlling any of the components 260 included with the security boxes 50.

The security boxes can send various types of alerts 280. These alerts 280 can include security alerts that indicate the presence of potential and/or real security threats (e.g., relating to active shooter situations, unauthorized visitors, or the like). The alerts 280 can also include hazard alerts that indicate the presence of dangerous environmental conditions (e.g., relating to the detection of smoke, fire, heat, carbon monoxide, gas, chemicals, earthquakes, and/or other hazardous conditions). The alerts 280 can further include separation alerts that indicate that an individual has been separated or isolated during an emergency situation (e.g., an active shooter situation, an earthquake, and/or other situation).

In certain embodiments, the alerts 280 transmitted by the security boxes 50 can be sent automatically in response to signals generated by the one or more sensors 262. For example, alerts 280 can automatically be sent in response to the one or more sensors 262 (e.g., the door sensor 290) generating a signal indicating that the door 230 of the security box housing has been opened; in response to the one or more sensors 262 generating a signal indicating the presence of one or more hazardous conditions; and/or in response to the one or more sensors 262 generating a signal indicating that an individual has pressed or activated an alert button (e.g., a physical button integrated into the security box housing or an electronic button provided on touch screen or input device of the security box) integrated into the security boxes 50. Other types of alerts 280 can also be transmitted. Any of the alerts 280 transmitted by the security boxes can be sent over the network 190 via wired and/or wireless communication links or channels. In certain embodiments, the electronic security platform 150 can receive any of the alerts 280 transmitted by the security boxes. The alerts 280 also can be received by other entities (e.g., law enforcement entities).

The electronic security platform 150 can be configured to implement various safety measures. In certain embodiments, in response to receiving an alert 280, the electronic security platform 150 can transmit notifications pertaining to the alert 280 over the network 190 to one or more individuals and/or can interface with various systems (such as law enforcement, emergency response, and/or private security networks). The notifications can include text messages, push notifications, e-mails, automated phone calls, inbox messages, voice notifications, and/or any other types of electronic communications. The notifications can provide information associated with the alert 280, including information identifying the type of alert 280 (e.g., active shooter alert, suspicious person alert, and/or hazardous environmental condition alert), the expected location of the incident (e.g., which may be determined based on the unique IDs associated with the security boxes 50 that first initiated the alert system or in other ways), safety instructions (e.g., indicating how to navigate to safety and/or avoid the incident), and/or other information. The notifications can be transmitted to, and displayed on, electronic computing devices 110 (e.g., mobile computing devices, wearable computing devices 140, and/or desktop computing devices) of various individuals (e.g., students, teachers, faculty, residents, employees, law enforcement agents, and/or security personnel). In certain embodiments, in response to receiving an alert 280, the electronic security platform 150 may determine or identify the locations of individuals (e.g., using GPS coordinates and/or tracking information communicated to the electronic security platform 150 by the electronic computing devices 110 and/or wearable 140) located in the vicinity of a threat, and transmit corresponding alerts or notifications to the individuals.

The electronic security platform 150 also can communicate or relay alerts 280 and notifications to the security boxes 50 to notify individuals in the proximity of the security boxes 50 of potential security threats or for other reasons. For example, in response to the electronic security platform 150 detecting a security threat (e.g., possibly based on an alert 280 or communication received from a particular security box 50), the electronic security platform 150 may initiate or transmit alerts or communications to some or all of the security boxes 50 included in the system 100 to provide them with information pertaining to the detected threat (e.g., information indicating the location of the threat, the type or nature of the threat, etc.). The alerts or communications transmitted to the security boxes 150 may be output by output devices 266 included on the security boxes 150.

In certain embodiments, the electronic security platform 150 can be in communication with, or integrated with, an access control system. The access control system can be configured to control access to specific areas of a location (e.g., a school) by communicating with and controlling electronic locks located at the location. Thus, the safety measures implemented by the electronic security platform can include using the access control system to control access to certain areas (e.g., by locking/unlocking doors) based on received alerts 280.

In certain embodiments, individuals may download an application on an electronic computing device 110 (e.g., mobile phone, desktop computer, tablet, smart watch, wearable device 140, or other computing device) and/or access a website which provides access to the electronic security platform 150 and its related functionality.

The electronic security platform 150 can provide useful information and functions via the application and/or website that can provide assistance with handling active shooter situations and/or other types of dangerous/emergency situations. For example, the application and/or website may permit the individual to transmit a request for first aid or to notify the electronic security platform 150, police, security, or others of ongoing active shooter incidents and/or other potential threats. The application and/or website can include functions for transmitting alerts (either automatically, or in response to selections or inputs received via interfaces) to the electronic security platform 150 related to such incidents. The application and/or website can include functions for transmitting and/or receiving videos, images, audio, textual descriptions, and/or other information related to the incidents. The application and/or website may provide, generate, and/or display graphical user interfaces (GUIs) that enable these functions to be performed (as well as any other functions associated with the electronic security platform described herein).

The application and/or website can further include functions that permit the electronic security platform 150 to track individuals' locations (e.g., while an incident is ongoing). The electronic security platform 150 can further provide information to the application and/or website for guiding individuals to safety and/or for avoiding the incident. The application, website, and/or electronic security platform 150 can also use the tracking information to determine whether or not an individual has been separated (e.g., kidnapped or trapped) due to an incident or threat. The application and/or website may generate one or more GUIs that show locations of individuals and/or components connected to the security system (e.g., security boxes 50, protective vests 252, wearable devices 140, etc.) and other location information associated with an emergency situation (e.g., locations of active shooters, locations of law enforcement and security personnel, locations of individuals who have been separated during an emergency situation, locations of injured and deceased individuals, locations of damaged structures, locations of earthquake or weather-related conditions, locations of hazardous environment conditions, locations of fires, locations where carbon monoxide is detected, etc.). The GUIs may display a map that shows this information and/or may display this information in other ways.

The application and/or website can access the electronic security platform 150 to receive training information (e.g., including audio, videos, images, and/or instructions) for reacting in a variety of different situations. For example, in certain embodiments, the training information can explain how to execute a three-step safety protocol for reacting to active shooter situations. Step 1 (Secure Step) can include information for securing a location (e.g., a classroom or an office), and can include training information related to utilizing the door securing devices 251 included in the security box 50 to secure a door or doors in a closed position. Step 2 (Protect Step) can include information for protecting the individuals at the location, and can include training information that demonstrates how to outfit individuals with the protective vests 252 included in the security boxes. Step 3 (Cover/Hide Step) can include information explaining how to limit the line-of-sight and prevent persons from viewing the location being secured, and can include training information that demonstrates how the vision obscuring accessories 253 in the security boxes can be utilized to limit outside persons from viewing the location being secured. In certain embodiments, the advantageous design of the security box 50 housing permits this three-step protocol to be quickly implemented and executed.

In certain embodiments, as mentioned above, the electronic security platform 150 also can communicate with one or more wearable devices 140. In certain embodiments, the wearable devices 140 can include one or more smart bracelets and/or smart watches. The wearable devices 140 can additionally, or alternatively, include one or more smart fabrics, smart glasses, fitness trackers, activity trackers, and/or the like. Each of the wearable devices 140 can include one or more sensors, one or more communication devices, one or more input devices, one or more output devices, one or more storage devices, and/or one or more processors (e.g., such as any of the sensors 262, communication devices 261, input devices 265, output devices 266, storage devices 263, and processors 264 mentioned in this disclosure). The wearable devices 140 and/or sensors incorporated into the wearable devices 140 may communicate with the electronic security platform 150 over the network 190 utilizing IoT protocols and/or other communication protocols (e.g., Wi-Fi or Bluetooth protocols).

The wearable devices 140 can be worn by various individuals (e.g., teachers, students, residents, travelers, office employees, etc.). The sensors-incorporated into the wearable devices 140 can be configured to detect various types of security threats and/or hazardous situations. In certain embodiments, the wearable devices 140 can include heart rate sensors that are capable of detecting heart rates of individuals equipped with the devices. In certain embodiments, the wearable devices 140 can include sensors that are capable of detecting impacts or shocks affecting the individuals that are equipped with the wearable devices. In certain embodiments, the wearable devices 140 can include sensors that are capable of detecting hazardous environmental conditions (e.g., smoke, fire, carbon monoxide, earthquakes, etc.). In certain embodiments, the wearable devices 140 can include sensors that are capable detecting locations (e.g., using global positing system or GPS coordinates) of the wearable devices 140 and/or individuals in possession of the wearable devices 140. In certain embodiments, the wearable devices 140 can include sensors that are capable detecting when alert options or buttons included on the wearable devices 140 are selected.

The wearable devices 140 can be configured to transmit wireless signals over the network to the electronic security platform 150 in response to signals generated by the sensors integrated into the wearable devices. Some of the signals transmitted over the network 190 can include alert signals indicating the presence of threats and/or hazardous situations. For example, in certain embodiments, signals may be transmitted over the network to the electronic security platform 150 in response to the sensors in a wearable device 140 detecting an elevated heart rate of an individual, an impact or shock affecting the individual, and/or hazardous environmental conditions (e.g., smoke, fire, carbon monoxide, etc.). Individuals in possession of the wearable devices 140 also can select options (e.g., buttons and/or graphical interface options) included on the wearable devices 140 to manually transmit alerts to the electronic security platform 150.

Upon reception of the signals at the electronic security platform 150, the electronic security platform 150 can analyze the signals to implement various safety measures as described herein (e.g., transmitting notifications to notify individuals about the threats or hazardous situations; using an access control system to control access to locations in the vicinity of the threats or hazardous situations; and providing guidance to individuals to avoid the threats or hazardous situations). In certain embodiments, the wearable devices 140 can be used to track the locations of the individuals who are equipped with the wearable devices 140, and this tracking information can be transmitted to the electronic security platform 150 to assist the electronic security platform with implementing the safety measures. For example, the tracking information can be used to identify individuals in the vicinity of a detected threat, notify the identified individuals of the detected threat, send instructions for guiding the individuals to safety, etc.

Like the security boxes 50, each of the wearable devices 140 can be associated with an ID that uniquely identifies the device and/or an individual associated with the device. The unique ID may be transmitted with the signals that are sent by the wearable device to enable the electronic security platform 150 to identify the device and/or individual associated with the device.

In certain embodiments, the electronic security platform 150 and/or security boxes 50 can be accessed by, or can communicate with, third-party electronic platforms, including electronic platforms associated with law enforcement agents, security professionals, or others. In certain embodiments, the electronic security platform 150 can operate independently of these third-party electronic platforms, but can communicate and exchange information with these platforms over the network (e.g., via an application programming interface or API). In other embodiments, the electronic security platform can be directly integrated into the third-party electronic platforms. In either case, the information and functions provided by the electronic security platform 150 can be harmonized with those third parties to enable more effective and coordinated responses to detected threats and hazardous situations.

As mentioned above, the system 100 described herein can be useful in many different environments including, but not limited to, sites 120 such as schools (e.g., preschools, elementary schools, high schools, colleges, universities, campuses and other types of school-based environments). In one exemplary application involving a school, the system 100 can applied to provide a security system in a school or school district that includes a plurality of different buildings. Various rooms (e.g., including classrooms, faculty rooms, administrator rooms, hallways, etc.) in each of the buildings can be outfitted with security boxes 50, each of which is communicatively coupled to the electronic security platform 150. Also, various individuals (e.g., such as students, teachers, security guards, and other individuals) located at these buildings can be equipped with wearable devices 140, each of which is communicatively coupled to the electronic security platform 150.

In the above example, the security boxes 50 and wearable devices 140 can transmit various types of alerts 280 (e.g., active shooter alerts, suspicious person alerts, elevated heart rate alerts, impact/shock alerts, separation alerts, hazard alerts, etc.) to the electronic security platform 150. These alerts 280 can be sent automatically based on sensor inputs or outputs, or can be sent manually (e.g., by selecting options included on the security boxes 50, options included on the wearable devices 140, and/or options made available via the user applications and/or websites). In response to receiving one or more of these alerts 280, the electronic security platform 150 can transmit notifications to various individuals (e.g., teachers, students, security guards, or other individuals). The notifications transmitted to these individuals can be customized based on their locations and/or based on other information. For example, alerts 280 transmitted to certain individuals, such as those located in the immediate vicinity of a potential and/or actual active shooter, can indicate that lock down protocols should be implemented (e.g., such as those involving the 3-Step protocol described herein). Other individuals, such as those not located in the immediate vicinity of the potential and/or actual active shooter incident, can receive alerts that provide instructions to relocate to a safer location and/or to employ other appropriate safety measures.

The reception of the alerts 280 by the electronic security platform 150 also can be used to control access (e.g., by locking and/or unlocking doors) to areas throughout the buildings in an appropriate manner to contain and control the incident. This may include restricting access to certain buildings, rooms and/or areas to prevent the incident from spreading to new areas, and/or can include granting access to certain buildings, rooms, and/or areas to facilitate safe passage of potential victims.

Any individual who is involved in a lock down procedure can utilize the equipment 250 included in the security boxes 50 to implement the lock down protocols. These individuals can also utilize the security boxes 50, applications, website, and/or wearable devices 140 to provide feedback (e.g., text, audio, and/or video indicating the statuses of classrooms, locations of active shooters, medical statuses of individuals, etc.) to the electronic security system 150 and/or third-party systems (e.g., law enforcement and security systems) during the incident. The electronic security platform 150 can then use this real-time information to transmit updated notifications to individuals located in the vicinity of the incident.

FIGS. 3A-3I disclose exemplary interfaces that can be displayed by an application that is associated with, or configured to communicate with, the electronic security platform 150 according to certain embodiments. The same or similar interfaces also can be provided via a website that is associated with, or configured to communicate with, the electronic security platform 150. The exemplary interfaces may be displayed on the electronic computing devices 110, wearable devices 140, and/or other devices.

Figure 3C:
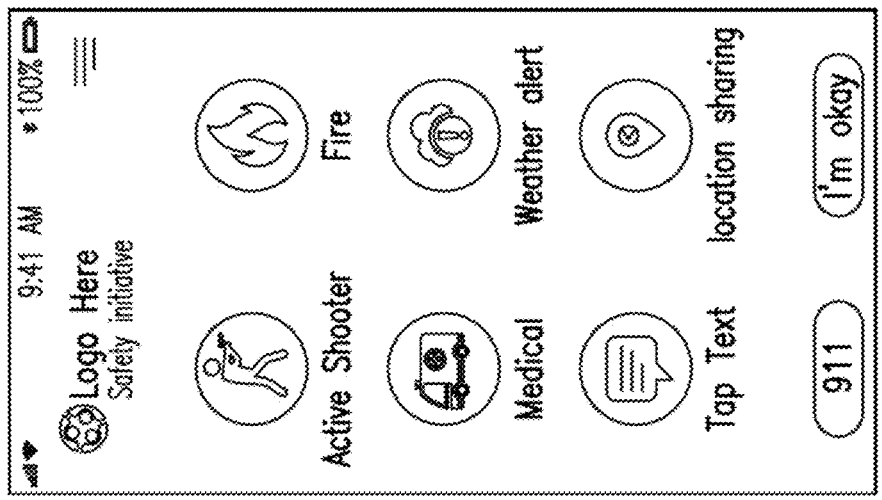
FIG. 3C is another exemplary interface that be displayed on an electronic device according to certain embodiments.
Figure 3B:
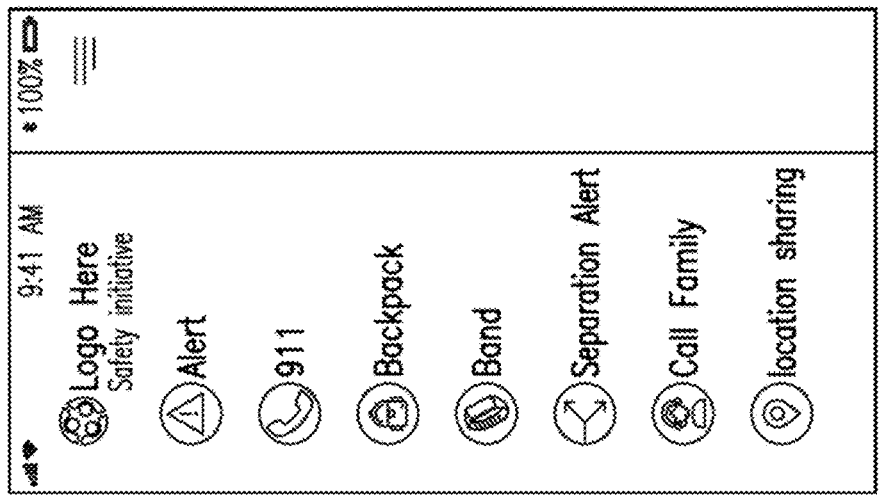
FIG. 3B is another exemplary interface that be displayed on an electronic device according to certain embodiments.
Figure 3A:
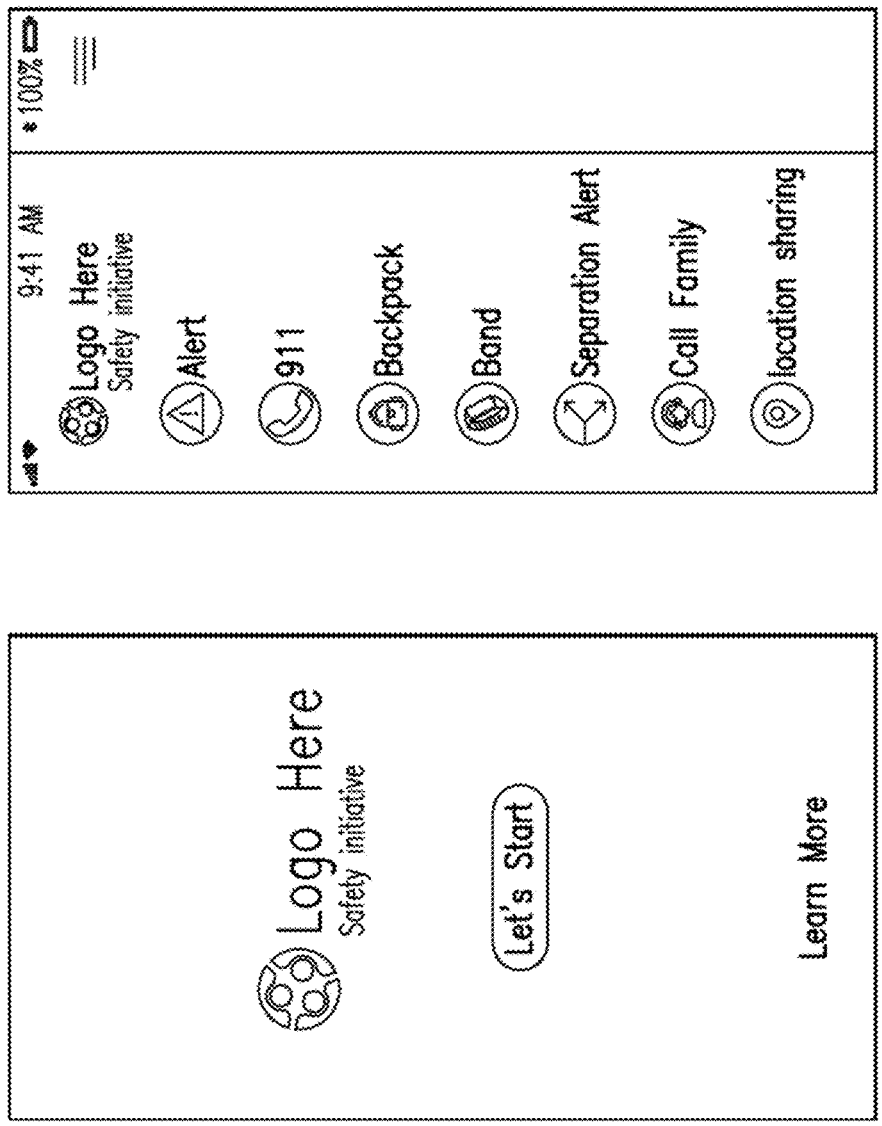
FIG. 3A is an exemplary interface that be displayed on an electronic device according to certain embodiments.

FIG. 3A is an interface 300A that displays an exemplary home screen provided by the application according to certain embodiments.

FIG. 3B is an interface 300B that displays an exemplary menu provided by the application according to certain embodiments. The menu includes options that can be presented using the application and selected by users accessing the application. These exemplary options provide information and functions for sending alerts (e.g., indicating the presence of an active shooter or indicating that an individual has been separated during an emergency situation), contacting 911 or other emergency services, integrating and associating the application with one or more protective vests or backpacks, integrating and associated the application with one or more wearable devices 140, contacting family members and other individuals, and sharing a location.

FIG. 3C is another interface 300C that displays an exemplary menu provided by the application according to certain embodiments. The options included on the interface can be used to send specific types of alerts (e.g., related to situations involving an active shooter, a fire, a medical condition, and/or a weather condition). Options are also provided for sending texts messages to (or initiating a chat with) the electronic security platform 150, and sharing an individual's location with the electronic security platform 150. The interface also includes options that allow the individual to specify "I'm Okay" or to contact law enforcement authorities.

Figure 3F:
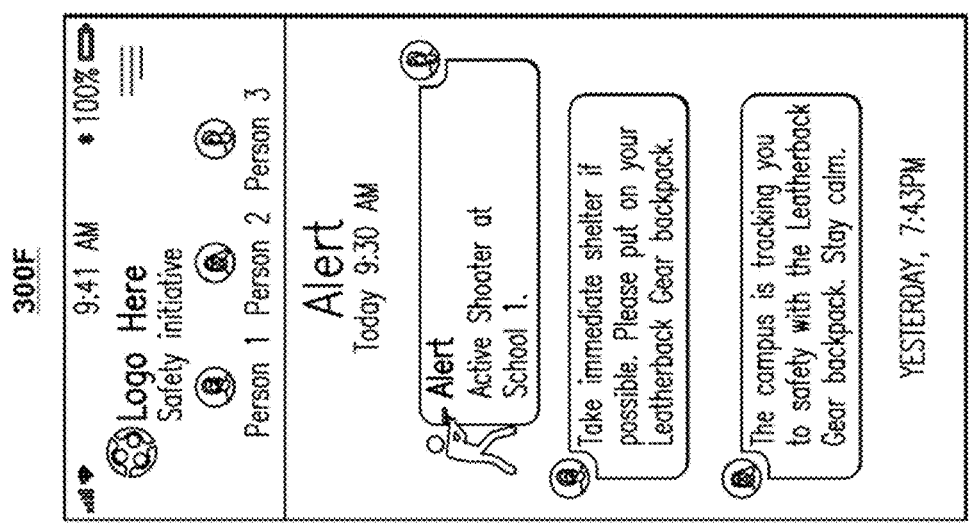
FIG. 3F is another exemplary interface that be displayed on an electronic device according to certain embodiments.
Figure 3E:
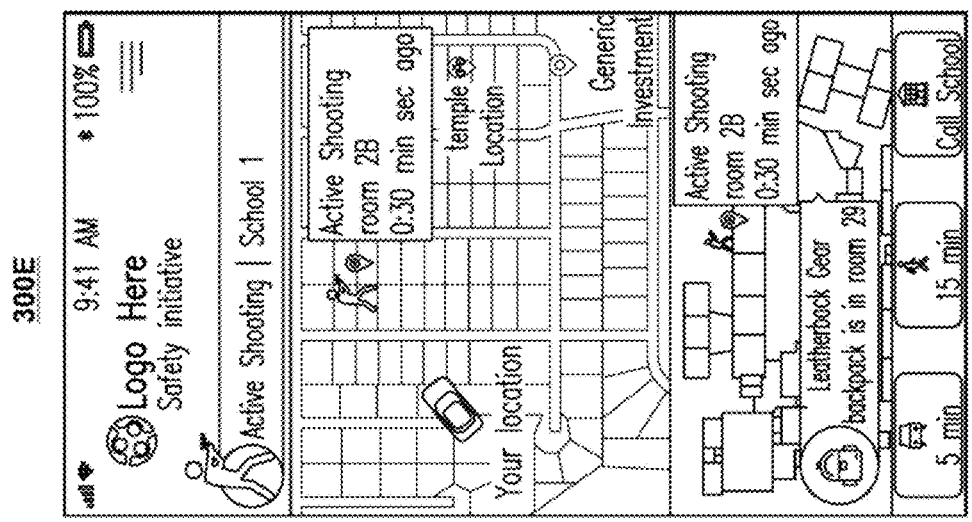
FIG. 3E is another exemplary interface that be displayed on an electronic device according to certain embodiments.
Figure 3D:
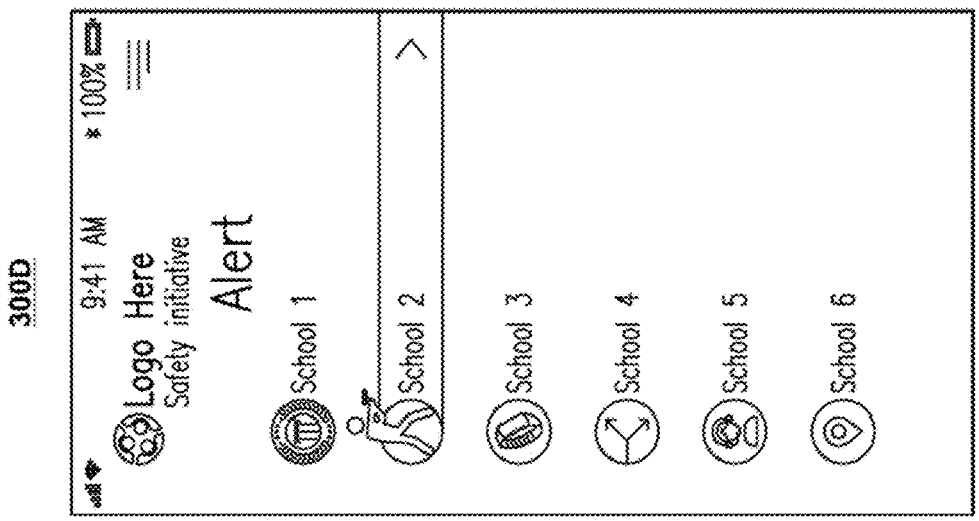
FIG. 3D is another exemplary interface that be displayed on an electronic device according to certain embodiments.

FIG. 3D is another interface 400D that displays a listing of exemplary sites 120 (e.g., schools) that are integrated with the electronic security platform 150 according to certain embodiments. Each of the options included in the listing may be selected to obtain information about the status of each site 120, as well as any threats, hazards, and/or dangers detected at the sites.

FIG. 3E is another interface 300E that displays a map that includes information associated with an active shooter alert according to certain embodiments. The map indicates the location of where an active shooter situation was detected, as well as the current location of the user. The map also indicates the locations of reported alerts or incidents pertaining to the active shooter situation (e.g., indicating locations and times where the active shooter was identified). In certain embodiments, the map can also identify the locations of other devices (e.g., computing devices 110, wearable devices 140, smart backpacks, etc.) that are connected to the electronic security platform 150.

FIG. 3F is another interface 300F that displays a chat or messaging feature that can be utilized by the application according to certain embodiments. The chat feature can be used to convey notifications, alerts, and instructions to individuals during an active shooter situation.

Figure 3I:
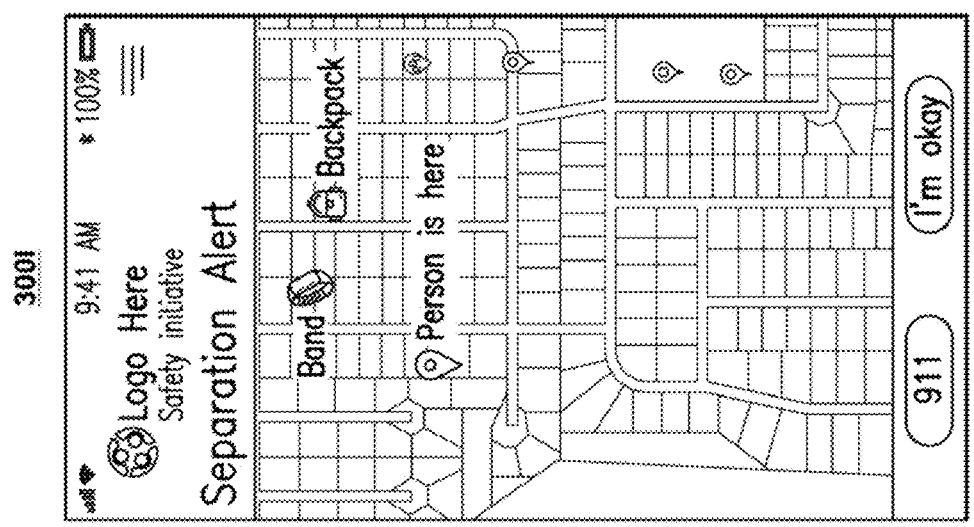
FIG. 3I is another exemplary interface that be displayed on an electronic device according to certain embodiments.
Figure 3H:
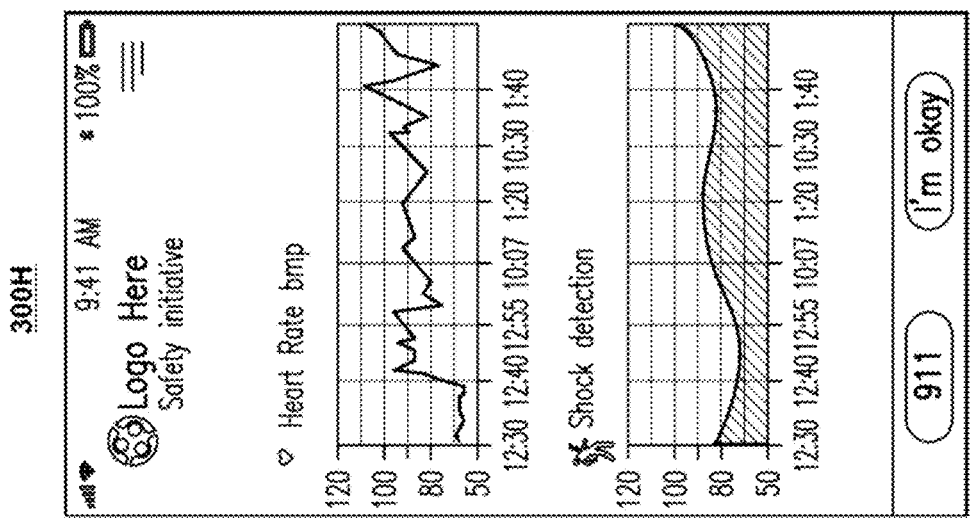
FIG. 3H is another exemplary interface that be displayed on an electronic device according to certain embodiments.
Figure 3G:
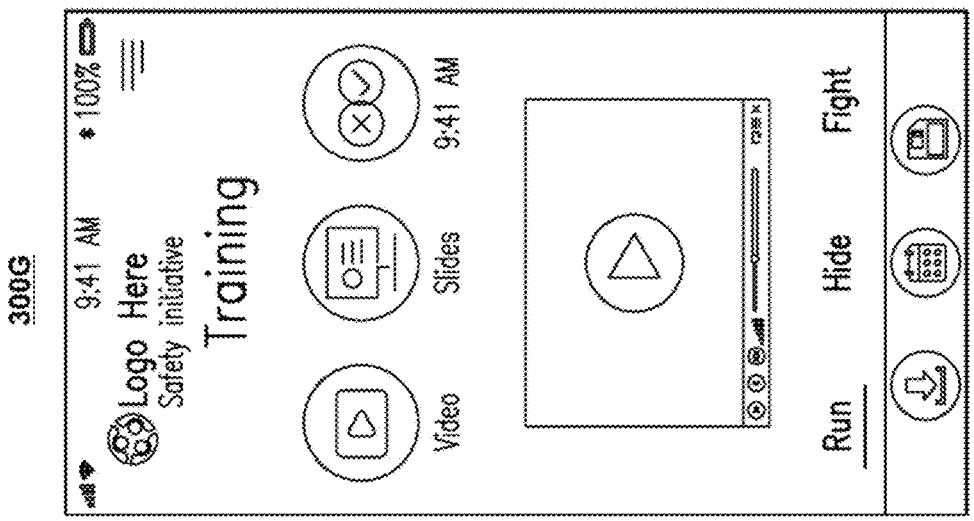
FIG. 3G is another exemplary interface that be displayed on an electronic device according to certain embodiments.

FIG. 3G is another interface 300G that displays exemplary training materials that can be provided according to certain embodiments. Users can utilize this interface to watch instructional videos, listen to audio training materials, and read various training information.

FIG. 3H is another interface 300H that displays feedback from wearable device sensors according to certain embodiments. After a wearable device 140 (e.g., a smart bracelet or wristband) has been paired or integrated with the application, the application can provide related feedback (e.g., showing heartrate information, shock detection information, location information, and/or other related information).

FIG. 3I is another interface 300I that displays a map showing information associated with a separation alert according to certain embodiments. The map shows the location of the individual who has been separated, as well as the locations of a wearable device 140 and a smart backpack that have been paired with or integrated with the application. The separation alerts may also useful for identifying individuals who have been taken hostage during active shooter situations and/or who have become trapped or isolated due to hazardous environment conditions (e.g., earthquakes or tornados). The electronic security platform 150 may utilize separation alerts to identify individuals who need assistance and to send assistance (e.g., law enforcement, security, and/or emergency response personnel) to those individuals.

Figure 4:
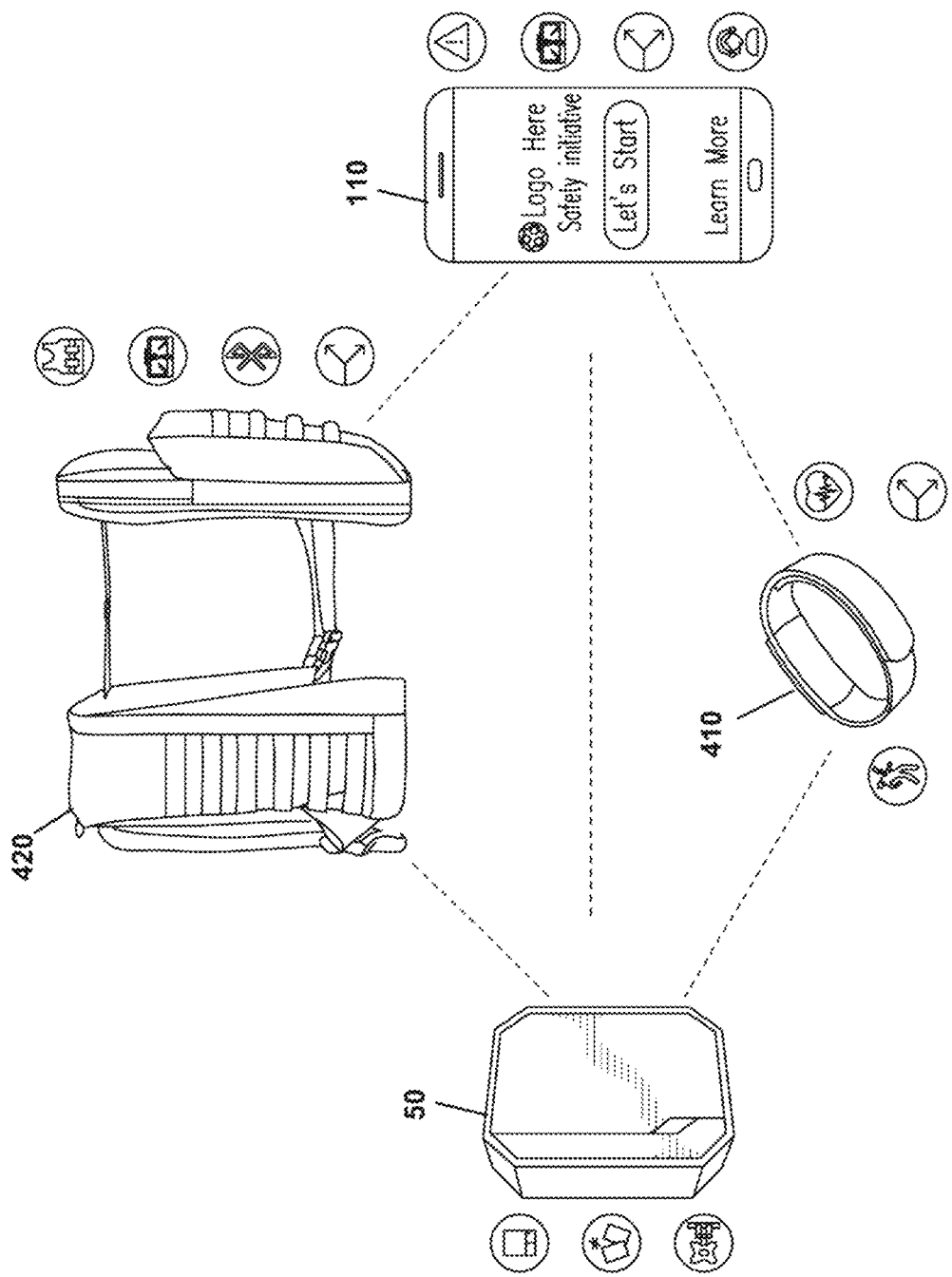
FIG. 4 is diagram illustrating various components of an exemplary security system according to certain embodiments.

FIG. 4 discloses additional details of components that may be incorporated into exemplary security systems 100 disclosed herein according to certain embodiments. As shown, the security system 100 may include one or more wearable devices 140 (e.g., smart bracelets or bands 410), one or more smart backpacks 420, one or more computing devices 110 (e.g., one or more mobile devices), and one or more security boxes 50. Each of these components may be configured to communicate with each other and the electronic security platform 150 either directly and/or over the network 190. Each of these components may be one or more communication devices and/or sensors (e.g., such as communication devices 261 and sensors 262 described herein). The electronic security platform 150 can monitor locations and statuses of these components (e.g., by monitoring GPS coordinates of the components). In certain embodiments, these components may be configured to communicate with each other and the electronic security platform 150 utilizing Wi-Fi, Bluetooth, IoT, and/or other communication and connectivity schemes.

It should be recognized that the embodiments described in this disclosure can be combined in various ways. Any aspect or feature that is described in connection with one embodiment can be incorporated into any other embodiment mentioned in this disclosure. Numerous variations can be made to the above-described systems and methods without departing from the scope of the invention.

While various novel features of the invention have been shown, described, and pointed out as applied to particular embodiments thereof, it should be understood that various omissions and substitutions and changes in the form and details of the systems and methods described and illustrated herein may be made by those skilled in the art without departing from the spirit of the invention. Amongst other things, the steps of the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the particular system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation.

What is claimed is:

1. A security system, comprising:
    at least one security box located at one or more sites, the at least one security box comprising:
        an internal cavity that includes one or more compartments, wherein the one or more compartments at least comprise: one or more door securing devices; one or more protective vests; and one or more vision obstruction accessories;
        a door that provides access to the internal cavity;
        one or more sensors configured to detect when the door is opened;
        a communication device configured to transmit an alert signal over a network in response to the one or more sensors detecting that the door has been opened, the alert signal indicating a presence of a potential security threat; and
        one or more power sources configured to supply power to the one or more sensors and the communication device; and
    one or more servers hosting an electronic security platform, wherein the electronic security platform is configured to receive the alert signal transmitted over the network, and execute safety measures to assess the potential security threat.

2. The system of claim 1, wherein:
    the at least one security box further comprises one or more input devices, the input devices at least comprising a microphone and a video camera;
    the at least one security box further comprises one or more output devices, the output devices at least including an audio speaker; and
    the one or more input devices and the one or more output devices are integrated directly into a housing of the at least one security box.

3. The system of claim 2, wherein the one or more input devices and the one or more output devices enable two-way communication with the electronic security platform.

4. The system of claim 1, wherein:
    the one or more door securing devices included in the one or more compartments comprise: one or more firehouse sleeves, one or more door wedges, one or more door barricades, one or more door jamming devices, or one or more door braces;
    the one or more protective vests included in the one or more compartments comprise one or more armor components; and
    the one or more vision obstruction accessories included in the one or more compartments comprise one or more covers that can be used to block a window or opening.

5. The system of claim 1, wherein:
    the at least one security box further comprises one or more non-transitory storage devices;
    the one or more non-transitory storage devices stores a unique identifier that is associated with the at least one security box; and
    the alert signal transmitted over the network includes the unique identifier.

6. The system of claim 5, wherein:
    in response to receiving the alert signal, the electronic security platform utilizes the unique identifier to identify a location of the potential security threat and generate content for transmitting one or more notifications pertaining to the potential security threat.

7. The system of claim 1, further comprising:
at least one wearable device that is configured to transmit a second alert signal to the electronic security platform that is associated with the potential security threat;
wherein the second alert signal is transmitted by the wearable device in response to:
  detection, by the wearable device, of an elevated heartrate of an individual;
  detection, by the wearable device, of an impact or shock affecting the individual;
  detection, by the wearable device, of the individual's location being in an area associated with the potential security threat; or
  detection, by the wearable device, of an alert option or button being selected.

8. The system of claim 7, wherein the at least one wearable device is a bracelet or smart watch that includes at least one second sensor that is configured to detect the elevated heartrate, the impact, the shock, the individual's location, or selection of the alert option.

9. The system of claim 1, wherein:
the electronic platform is configured to initiate communications with one or more additional security boxes located in a vicinity of the at least one security box in response to detecting the potential security threat;
the electronic platform is configured to relay or transmit information associated with the alert signal to one or more mobile devices located in a vicinity of the at least one security box in response to detecting the potential security threat; and
the electronic platform is configured to relay or transmit information associated with the alert signal to a law enforcement entity or a security entity in response to detecting the potential security threat.

10. The system of claim 1, wherein:
the system comprises a plurality of security boxes;
each of the plurality of security boxes is configured for two-way communication with the electronic security platform;
each of the plurality of security boxes is configured to transmit alerts to the electronic security platform;
the alerts transmitted to the electronic security platform at least comprise:
  alerts identifying an actual or potential active shooter situation; and
  alerts indicating that doors included on the plurality of security boxes have been opened;
each of the plurality of security boxes includes an output device that is configured to output audio or voice data received from the electronic security platform; and
each of the plurality of security boxes includes one or more input devices that are configured to transmit audio and video data to the electronic security platform.

11. A security box, comprising:
an internal cavity that includes one or more compartments, wherein the one or more compartments at least comprise: one or more door securing devices; one or more protective vests; and one or more vision obstruction accessories;
a door that provides access to the internal cavity;
one or more sensors configured to detect when the door is opened;
a communication device configured to transmit an alert signal over a network in response to the one or more sensors detecting that the door has been opened, the alert signal indicating a presence of a potential security threat; and
one or more power sources configured to supply power to the one or more sensors and the communication device; and
wherein the communication device is configured to transmit the alert signal over the network to an electronic security platform that is configured to provide functions associated with monitoring security at one or more sites.

12. The security box of claim 11, wherein:
the security box further comprises one or more input devices, the input devices at least comprising a microphone and a video camera;
the security box further comprises one or more output devices, the output devices at least including an audio speaker; and
the one or more input devices and the one or more output devices are integrated directly into a housing of the security box.

13. The security box of claim 12, wherein the one or more input devices and the one or more output devices enable two-way communication with the electronic security platform.

14. The security box of claim 11, wherein:
the one or more door securing devices included in the one or more compartments comprise: one or more firehouse sleeves, one or more door wedges, one or more door barricades, one or more door jamming devices, or one or more door braces;
the one or more protective vests included in the one or more compartments comprise one or more armor components; and
the one or more vision obstruction accessories included in the one or more compartments comprise one or more covers that can be used to block a window or opening.

15. The security box of claim 11, wherein:
the security box further comprises one or more non-transitory storage devices;
the one or more non-transitory storage devices stores a unique identifier that is associated with the security box; and
the alert signal transmitted over the network includes the unique identifier.

16. The security box of claim 15, wherein:
in response to receiving the alert signal, the electronic security platform utilizes the unique identifier to identify a location of the potential security threat and generate content for transmitting one or more notifications pertaining to the potential security threat.

17. The security box of claim 11, wherein:
the electronic platform is configured to initiate communications with one or more additional security boxes located in a vicinity of security box in response to detecting the potential security threat;
the electronic platform is configured to relay or transmit information associated with the alert signal to one or more mobile devices located in a vicinity of the security box in response to detecting the potential security threat; and
the electronic platform is configured to relay or transmit information associated with the alert to a law enforcement entity or a security entity in response to detecting the potential security threat.

18. The security box of claim 11, wherein:
the security box is configured to communicated with one or more additional security boxes via the electronic security platform.

* * * * *